April 21, 1936.  W. S. CEABLOM  2,038,268

BRAKE

Filed April 15, 1935

INVENTOR
W. S. CEABLOM
By J. S. G. Cook
ATTORNEY

Patented Apr. 21, 1936

2,038,268

UNITED STATES PATENT OFFICE 2,038,268

BRAKE

Wendell S. Ceablom, St. Louis, Mo., assignor to Beehler Steel Products Company, St. Louis, Mo., a corporation of Missouri Application April 15, 1935, Serial No. 16,308

8 Claims. (Cl. 188—78)

This invention relates generally to brakes, and more specifically to brakes of the internal expansion type which include wedges for moving the brake shoes of the brakes into braking contact with the brake drums thereof, the predominant object of the invention being to provide brakes of the type mentioned with means for rendering the wedges thereof capable of floating movement so as to equalize pressure of the brake shoes against the brake drums when the brakes are applied.

Brakes employed on certain makes of motor vehicles include wedges for moving the brake shoes into braking contact with the brake drums when the brakes are applied. In applying one of these brakes, the wedge thereof is moved downwardly in contact with rollers carried by adjacent end portions of the brake shoes so as to move said adjacent end portions of the shoes away from each other and into braking contact with the associated brake drum. It frequently happens that the brake lining of one shoe of a brake of this type wears faster than the brake lining of the associated shoe, hence there is greater clearance between the lining of one shoe and the brake drum than between the lining of the other shoe and the brake drum. When this situation prevails, downward movement of the wedge of the brake is arrested when the shoe which requires the least distance of travel to attain the drum-contacting position contacts with the drum, and as a result thereof the other shoe is not moved into braking contact with the drum. This unequal application of braking pressure upon the brake drum causes the brake to groan and chatter when it is applied.

The improved structure disclosed herein includes means for so supporting and guiding the wedge that it is capable of lateral movement as well as downward, brake-applying movement. As a result of this arrangement a floating wedge is provided, which, in the event more clearance is present between one shoe and the brake drum than between the other shoe and the brake drum, will be automatically shifted laterally when the shoe having the shortest distance to travel to the braking position atttains that position so as to continue its downward movement to move the other shoe to the braking position.

Figure 1:
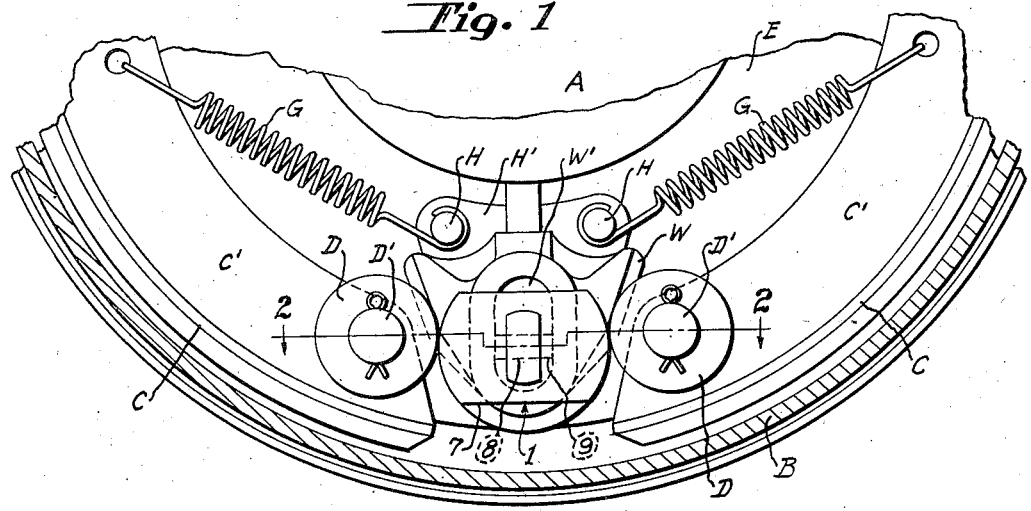
Fig. 1 is a fragmentary view, partly in section and partly in elevation, of a brake having associated therewith my improved wedge supporting and guiding means.
Figure 2:
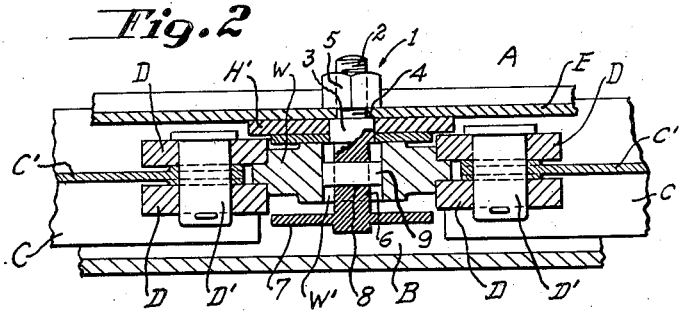
Fig. 2 is a fragmentary section on line 2—2 of Fig. 1.
Figure 3:
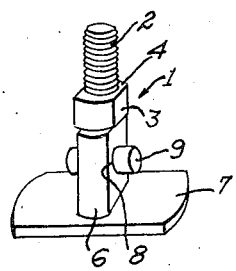
Fig. 3 is an isometric view of the improved wedge supporting and guiding means.

In the drawing, wherein is shown for the purpose of illustration, merely, one embodiment of the invention, A designates generally the braking structure shown in Figs. 1 and 2, said structure including a brake drum B, brake shoes C mounted in the usual manner and provided with rollers D rotatably mounted on pins D' supported by the web portions C' of the brake shoes C, and a stationary backing plate E. W designates a wedge whose inclined side edge faces contact with the rollers D in the manner illustrated in Fig. 2, said wedge being provided with a vertical, elongated opening W' formed therethrough from front to back. The brake shoes C have coil springs G associated therewith in the usual manner illustrated in Fig. 1, these coil springs being attached at their opposite ends to the brake shoes and to pins H extended from a support H' fixed to the backing plate E, and being adapted to draw the shoes out of contact with the brake drum and maintain the rollers D in contact with the wedge W. The wedge W has means associated therewith (not shown) for moving the wedge downwardly so as to move the brake shoes into braking contact with the brake drum.

Fixed to the backing plate E of the brake structure illustrated in Figs. 1 and 2 is the improved wedge guide 1, which comprises an elongated member having a screw-threaded portion 2 at one end which is extended through an opening formed through the backing plate E, said screw-threaded portion being of less diameter than an adjacent portion 3 of the wedge guide so as to provide a shoulder 4 that contacts with the inner face of the backing plate adjacent to the opening through which the screw-threaded portion 2 passes. The wedge guide 1 is secured to the backing plate through the use of a nut 5, which is screwed on the screw-threaded portion 2 of said wedge guide and into close contact with the outer face of the backing plate. The portion 6 of the wedge guide passes through the wedge opening W' and is of less width than said wedge opening, so as to provide spaces between the opposite side faces of the portion 6 and the opposite side walls of the wedge opening W'. At the end of the wedge guide opposite to the screw-threaded end thereof a plate 7 is fixed to said wedge guide, and this plate is arranged in spaced apart, overlapping relation with respect to the wedge W, as shown in Fig. 2.

Formed transversely through the portion 6 of the wedge guide 1 is an opening 8 in which is supported a pin 9. The pin 9 is of such length that it contacts at its opposite ends with the opposed side walls of the wedge opening W', and said pin is slidably supported in the opening 8 so as to be capable of moving longitudinally of its major axis relative to the wedge guide.

When in the use of a brake provided with the improved wedge guide disclosed herein the wedge W is moved downwardly to apply the brake, the downwardly moving, inclined, side edge faces of the wedge contacting with the rollers D move the adjacent end portions of the brake shoes into braking contact with the brake drum in the usual manner, and if the clearances between the opposed brake shoes and the brake drum correspond, the movement of the wedge is in a downward direction only. However, if the clearance between one brake shoe and the brake drum is greater than the clearance between the other brake shoe and the brake drum, the wedge will be moved downwardly until the brake shoe having the least distance to travel to the braking position attains such braking position, whereupon continued downward pressure on the wedge will cause said wedge to move laterally and continue its downward movement until the other brake shoe has reached the braking position. When the wedge moves laterally as described, the pin 9 moves with the wedge, said pin being shifted longitudinally of its major axis relative to the wedge guide.

From the foregoing it is plain that a floating wedge is provided which automatically shifted so as to cause both associated brake shoes to be applied with equal pressure against the brake drum, in spite of differences in clearance between the brake shoes and the brake drum.

I claim:

1. A brake including a brake drum, a pair of braking elements movable into and out of braking contact with said brake drum, a reciprocatory wedge for moving said braking elements into braking contact with said brake drum, said wedge having an opening formed therethrough, a fixed member of less width than said wedge opening extended through said opening in spaced relation to said wedge, an element slidably secured in said member and arranged in contact with opposed walls of said wedge opening, said movable elements being supported by said member for movement transversely of said member, and a support for said member.

2. A brake including a brake drum, a pair of braking elements movable into and out of braking contact with said brake drum, a reciprocatory wedge for moving said braking elements into braking contact with said brake drum, said wedge having an opening formed therethrough, a fixed member of less width than said wedge opening extended through said wedge opening in spaced relation to the wedge, a non-resilient guide element movably associated with said member and arranged in contact with opposed walls of said wedge opening, said movable guide element being supported in an opening formed through said member for movement transversely of said member, and a support for said member.

3. A brake including a brake drum, a pair of braking elements movable into and out of braking contact with said brake drum, a reciprocatory wedge for moving said braking elements into braking contact with said brake drum, said wedge having an opening formed therethrough, a fixed member of less width than said wedge opening extended through said wedge opening in spaced relation to said wedge, a non-resilient guide element movably associated with said member and arranged in contact with opposed walls of said wedge opening, said movable guide element being supported in an opening formed through said member for movement transversely of said member, a support for said member, and a plate fixed to said member at one end thereof.

4. A guide for brake wedges comprising a non-rotatable elongated member having a screw-threaded portion at one end, and a non-resilient element slidably supported by said member for movement transversely thereof.

5. A guide for brake wedges comprising an elongated, fixed member having a screw-threaded portion at one end, a plate at the opposite end of said elongated member, and a non-resilient element slidably supported by said member for movement transversely thereof.

6. A guide for brake wedges comprising an elongated, fixed member having a screw-threaded portion at one end, and a non-resilient element slidably supported in an opening formed through said member for movement transversely of said member.

7. A guide for brake wedges comprising an elongated, fixed member having a screw-threaded portion at one end, a plate at the opposite end of said elongated member, and a non-resilient element slidably supported in an opening formed through said member for movement transversely of said member.

8. A brake mechanism including a brake drum, a pair of braking elements, a reciprocatory wedge member for moving the braking elements into braking contact with said drum, said wedge having an opening extending therethrough, a member projecting through said opening in spaced relation to the wedge, and a guide element slidably supported by said member and engaging opposite walls of the wedge opening, said guide element being slidable in a direction transversely to the line of reciprocation of said wedge.

WENDELL S. CEABLOM.